under 35 U.S.C. 154(b) by 0 days.

(12) United States Patent
Nemeth et al.

(10) Patent No.: US 7,665,302 B2
(45) Date of Patent: *Feb. 23, 2010

(54) DEVICE FOR SUPPLYING FRESH AIR TO A TURBOCHARGED PISTON INTERNAL COMBUSTION ENGINE AND METHOD FOR OPERATING THE SAME

(75) Inventors: Huba Nemeth, Budapest (HU); Eduard Gerum, Rosenheim (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/844,468

(22) Filed: Aug. 24, 2007

(65) Prior Publication Data

US 2008/0066467 A1 Mar. 20, 2008

Related U.S. Application Data

(63) Continuation of application No. PCT/EP2006/001737, filed on Feb. 24, 2006.

(30) Foreign Application Priority Data

Feb. 24, 2005 (DE) .................. 10 2005 008 405
Oct. 28, 2005 (DE) .................. 10 2005 051 687

(51) Int. Cl.
F02B 33/44 (2006.01)
(52) U.S. Cl. .................. 60/605.1; 60/611; 60/612
(58) Field of Classification Search ............. 60/605.1, 60/611, 607, 609, 612, 602
See application file for complete search history.

(56) References Cited

U.S. PATENT DOCUMENTS 2,983,267 A * 5/1961 Percival ............. 123/559.1
3,020,901 A * 2/1962 Cook ............. 123/559.1
3,427,802 A * 2/1969 Ruoff ............. 60/605.1

(Continued)

FOREIGN PATENT DOCUMENTS

DE 1 960 544 6/1971

(Continued)

OTHER PUBLICATIONS

International Search Report w/English translation dated Apr. 26, 2006 (six (6) pages).

(Continued)

*Primary Examiner*—Thomas E Denion
*Assistant Examiner*—Mary A Davis
(74) *Attorney, Agent, or Firm*—Crowell & Moring LLP (57) ABSTRACT

A device and method for supplying fresh air to a turbocharged piston internal combustion engine are described. According to the invention, a fresh gas line section of an intake manifold has an adjustable flap, and inlet and outlet ports. An adjustment device is coupled to the flap for adjusting the flap. A compressed air port having an opening leading into a chamber of the fresh gas line between the flap and the outlet is provided, and a quantity regulating device with a valve to control the compressed air is also provided. An electronic control unit controls the quantity regulating device and the adjustable flap, so that the fully opened position of the flap corresponds to a fully blocked position of the quantity regulating device.

15 Claims, 6 Drawing Sheets

U.S. PATENT DOCUMENTS

| | | | |
|---|---|---|---|
| 3,673,796 A | | 7/1972 | Weick et al. |
| 4,428,227 A | * | 1/1984 | Yamagata et al. .............. 73/115 |
| 4,445,336 A | * | 5/1984 | Inoue ......................... 60/605.1 |
| 4,481,773 A | * | 11/1984 | Sugito et al. ................... 60/606 |
| 4,628,880 A | * | 12/1986 | Aoyama et al. .............. 123/432 |
| 5,064,423 A | | 11/1991 | Lorenz et al. |
| 5,819,538 A | * | 10/1998 | Lawson, Jr. ................... 60/611 |
| 6,618,631 B1 | * | 9/2003 | Johnson et al. ............... 700/28 |
| 6,945,221 B2 | * | 9/2005 | Baeuerle ..................... 123/319 |
| 2004/0177838 A1 | * | 9/2004 | Veinotte ............... 123/568.17 |

FOREIGN PATENT DOCUMENTS

| | | | |
|---|---|---|---|
| DE | 3737743 A1 | * | 5/1989 |
| DE | 39 06 312 C1 | | 12/1989 |
| DE | 197 81 513 | | 3/1999 |
| DE | 19913157 A1 | * | 10/2000 |
| FR | 2 833 650 | | 6/2003 |
| FR | 2 833 650 A1 | | 6/2003 |
| GB | 1 323 449 | | 11/1970 |
| JP | 02215930 | | 8/1990 |
| JP | 6-299879 | | 10/1994 |
| JP | 06-299879 | | 10/1994 |
| JP | 6-299879 A | | 10/1994 |
| JP | 06299879 A | * | 10/1994 |
| JP | 07-091267 | | 4/1995 |
| JP | 7-91267 | | 4/1995 |
| JP | 7-91267 A | | 4/1995 |
| JP | 07091267 A | * | 4/1995 |
| WO | WO 2005/064134 | | 7/2005 |
| WO | WO 2005/064134 A1 | | 7/2005 |

OTHER PUBLICATIONS

Form PCT/IPEA/416 one (1) page; Form PCT/IPEA/409 three (3) pages; PCT Form/Supplementary sheet/409 (EPO-Apr. 2005) and amended sheets w/English translation sixteen (16) pages for a total of twenty (20) pages.

Form PCT/IB/338 & Form PCT/IPEA/409 (seven (7) pages).

German Office Action dated Jul. 18, 2008 together with English translation.

International Search Report mailed Apr. 26, 2006.

* cited by examiner

DEVICE FOR SUPPLYING FRESH AIR TO A TURBOCHARGED PISTON INTERNAL COMBUSTION ENGINE AND METHOD FOR OPERATING THE SAME

CROSS REFERENCE TO RELATED APPLICATIONS

This application is a continuation of PCT International Application No. PCT/EP2006/001737, filed Feb. 24, 2006, which claims priority under 35 U.S.C. §119 to German Patent Application No. 10 2005 008 405.2 filed Feb. 24, 2005 and German Patent Application No. 10 2005 051 687.4 filed Oct. 28, 2005, the entire disclosures of which are herein expressly incorporated by reference.

BACKGROUND AND SUMMARY OF THE INVENTION

The invention relates to a device for supplying fresh air to a turbocharged piston internal combustion engine having a fresh gas line section as an intake manifold which has an adjustable flap, a first end port for flowing in and a second end port for flowing out, between which ports a pivotably mounted shaft for the adjustable flap is provided in the tubular wall, said flap being coupled to an adjustment device for the purpose of adjustment, a compressed air port with an opening leading into the tubular interior between the flap and the second end port.

In addition, the invention also relates to a method for operating such a device for supplying fresh air to the turbocharged engine.

It is a known property of piston internal combustion engine with turbocharging that when the throttle is opened in the vehicle, the engine reacts with a certain degree of delay because the turbocharger can increase the supplied air quantity only slowly, which is known as a turbolag in the torque profile.

German Patent Document DE-PS-39 06 312 discloses a method and structure for reducing or shortening the turbolag, in which case, while the diesel engine is accelerating, a specific quantity of air is blown into the intake manifold from a compressed air accumulator. The fuel injection quantity is adapted accordingly. The turbocharged diesel engine is suitable particularly for use in commercial vehicles, such as city buses with an automatic transmission and compressed air brake system. The city buses perform a certain travel cycle by being able to predict the load and the rotational speed process of the diesel engine precisely, and in this way the blow-in time and the air quantity can be predetermined. The conditions of use for utility motor vehicles which are used in long distance traffic are quite different. These vehicles do not have any regular travel cycles and the payload varies within wide limits. Also, the driving style of the driver can exhibit large differences. The above structure and method are not well suited to address these problems.

The embodiments of the present invention provide a device and a method with which the blowing in of air can be adapted to the driving style and payload of the vehicle. At the same time the device can be installed or retrofitted as one mounted unit in various fresh gas line systems of diesel engines.

One advantage of the invention results from the fact that a flap in the fresh gas line is activated under electronic control, that is to say not only automatically by the fresh gas pressure, as is done conventionally, and that the activation is determined and processed electronically by the control unit, specifically as a function of the fresh gas pressure and also of other engine parameters.

According to an exemplary embodiment of the invention, the compressed air port is provided with a quantity regulating device which has a valve having a blocked position and any desired number of opened positions, and the quantity regulating device also has an electric/electronic input which is connected to the output of an electronic control unit, the input of the adjusting device of the flap being connected to the second output of the electronic control unit, so that the fully opened position of the flap is assigned a fully blocked position of the quantity regulating device. For example, an electronic control unit may control the position of the flap and of the quantity regulating device of the blown-in air. When the flap is commanded to the fully open position, the programming of the control unit may command the quantity regulating device to the fully blocked position. In other cases, intermediate positions of either or both devices may be commanded by the control unit.

The following exemplary outputs are preferably connected to the inputs of the electronic control unit according to this embodiment: output of the first pressure pickup whose pressure meter is arranged in the tubular interior between the flap and the first end port for flowing in and output of the second pressure pickup whose pressure meter is arranged in the tubular interior between the flap and the second end port for flowing out.

According to one advantageous exemplary embodiment of the invention, in the electronic control unit, the torque request signal can originate from one or more of the following sources: accelerator pedal, traction controller, cruise controller, electric stability program, driving assistance system or other systems which feed an external torque request to the engine control system.

According to another advantageous exemplary embodiment of the invention, the adjustment device of the flap also includes a position determining sensor for direct activation by the electronic control unit.

The exemplary embodiments of the invention also include a method for improving the acceleration behavior and emission behavior of a vehicle piston internal combustion engine, in particular of a diesel engine with turbocharging. A device is provided which has the purpose of supplying fresh air, and includes a compressed air accumulator in which compressed air is stored to be blown, in a regulated, temporary fashion, into the intake of the engine cylinder.

According to an exemplary embodiment of the invention, the method contains the following method steps:

determination of the torque request signal and feeding of the data to the electronic control unit, determination of the engine characteristic values and feeding of the values to the electronic control unit, determination of the position of the flap and feeding of the values to the electronic control unit, determination of the air pressure in the interior of the fresh gas line section between the first end port and flap or second end port and flap and feeding of the pressure values to the electronic control unit, determination of the air pressure in the interior of the intake line between the cylinder inlet valve and flap and feeding of the pressure value to the electronic control unit, as well as determination of the air pressure in the interior of the intake line between the flap and turbocompressor, and feeding of the pressure value to the electronic control unit, processing of the abovementioned data and the measured values in the electronic control unit in order to produce activation output signals for opening/closing the compressed air valve for the temporary blowing into the intake line, and simultaneous activation of the flap in the closing direction at the start of the blowing in process and in the opening direction at the end of the blowing in process.

According to one advantageous exemplary embodiment of the method, the following additional method steps may be carried out:

determination of the average frequency of the driver's request for acceleration by the software in the control unit, regulation of the blowing in of air and activation of the flap in an adaptive fashion with respect to the determined average frequency of the driver's request so that the air consumption is kept within certain limits but without an abrupt change in the duration of the air blowing in process.

Other objects, advantages and novel features of the present invention will become apparent from the following detailed description of the invention when considered in conjunction with the accompanying drawings.

BRIEF DESCRIPTION OF THE DRAWINGS

The invention will be presented in detail below by means of an exemplary embodiment of a diesel engine and using drawings, in which.

DETAILED DESCRIPTION OF THE DRAWINGS

Figure 1:
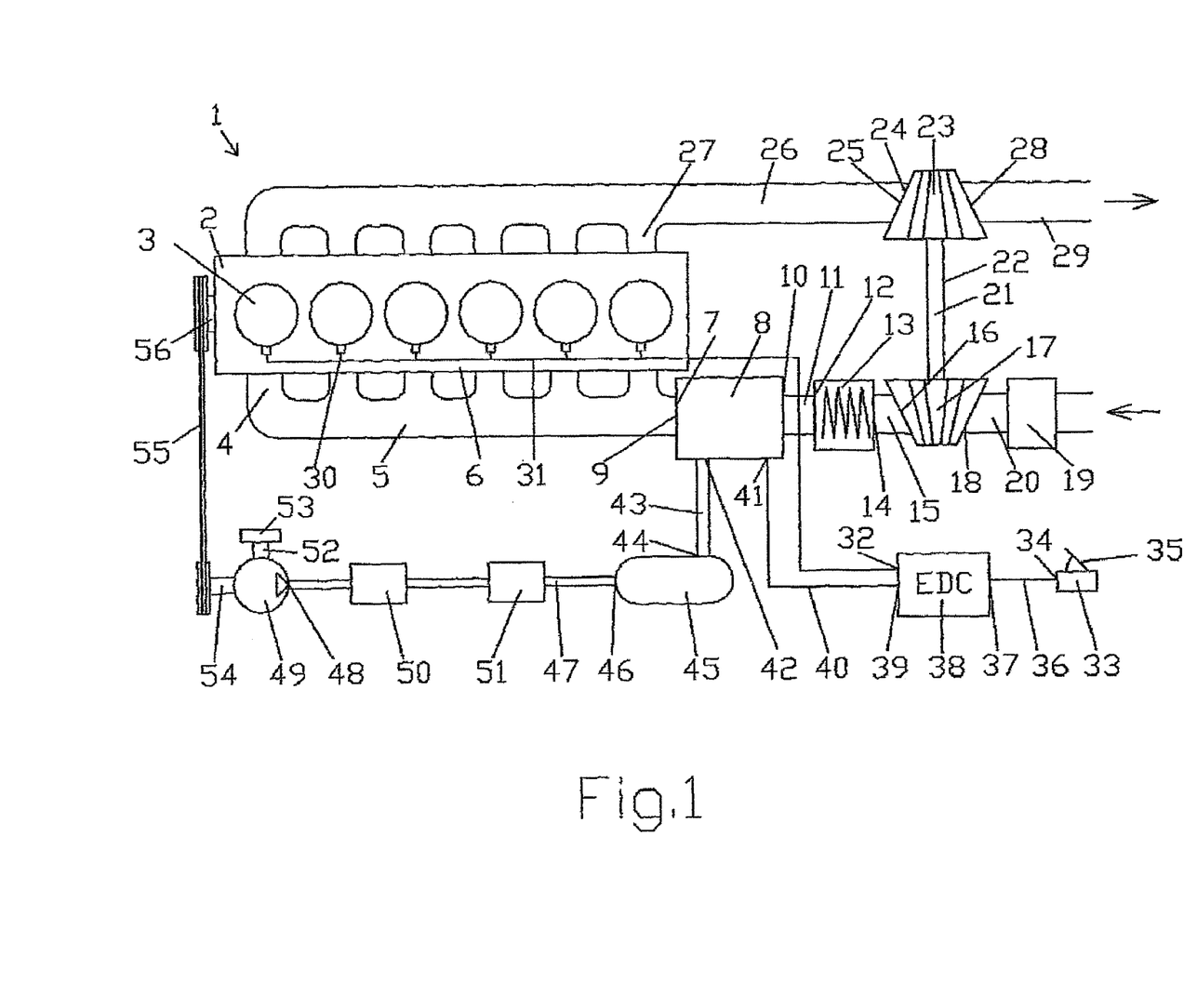
FIG. 1 is a schematic illustration of a device for supplying fresh air to a turbocharged piston internal combustion engine.

According to the exemplary embodiment shown in FIG. 1, the turbocharged diesel engine 2 has six cylinders 3 in series, the intake lines 4 of which are connected to a collecting line or manifold 5 which has a connecting flange 7 to which a fresh gas line section 8 is connected by its second end port 9 for flowing out. The first end port 10 for flowing in is coupled, for example, by a line 11 to the outflow opening 12 of the charge air cooler 13, whose inflow opening 14 may be coupled by a line 15 to the outflow opening 16 of the turbocompressor 17. An air filter 19 may be connected to the inflow opening 18 of the turbocompressor 17 using the line 20. The exemplary turbocompressor 17 forms part of the exhaust gas turbocharger 22 whose exhaust gas turbine 23 is connected by its inflow opening 28 to the outflow opening 25 of the exhaust collecting pipe 26. other configurations of the above elements may also be used, according to the invention. The turbocompressor 17 and the exhaust gas turbine 23 are attached to the shaft 21. The cylinders 3 are connected by exhaust lines 27 to the exhaust collecting pipe 26. The outflow opening 28 of the exhaust gas turbine 23 is coupled to the exhaust pipe 29. Those of skill in the art will understand that different numbers and configuration of cylinders may be used according to the invention. Multiple turbochargers, superchargers and/or other forced induction systems may also be used in the turbocharged engine according to the invention.

In this example, the fuel supply to the cylinders 3 may be provided by the injection nozzles 30 which are regulated by the line 31 from the first output 32 of the electronic control unit 38. The output 34 of the electronic control unit 33 is connected by the line 36 to the input 37 of the electronic control unit 38. The control unit 33 may have an activation element which in this exemplary embodiment may include an accelerator pedal 35. The electric terminal 39 of the electronic control unit 38 may be operatively coupled to the electric terminal 41 of the fresh gas line section 8 by the collecting line 40.

The exemplary fresh gas line section 8 may include a compressed air port 42 which is connected by the line 43 to the outlet port 44 of the compressed air vessel 45. The feed port 46 of the compressed air vessel 45 is connected by the line 47 to a source of compressed air, such as, for example, the compressed air port 48 of the compressed air compressor 49. The pressure regulator 50 and air dryer 51 may be installed in the system, such as in the line 47. The compressed air compressor 49 may have an intake connector 52 which is provided with an air filter 53. The shaft 54 of the compressed air compressor 49 may be connected to the main shaft 56 of the turbocharged diesel engine by the belt drive 55, or may be operated in other conventional manner.

Figure 2:
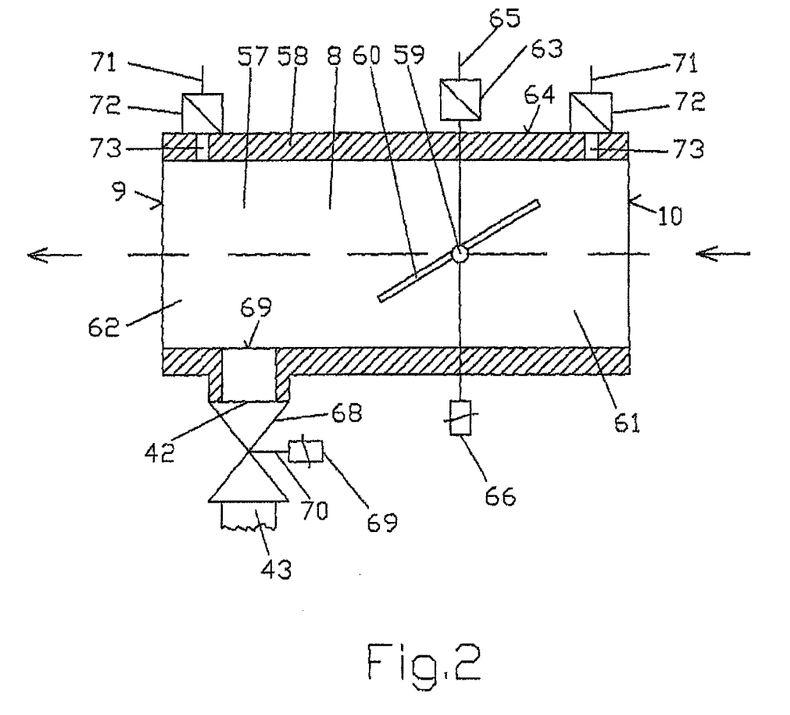
FIG. 2 shows the fresh gas line section of the device according to FIG. 1.
Figure 3:
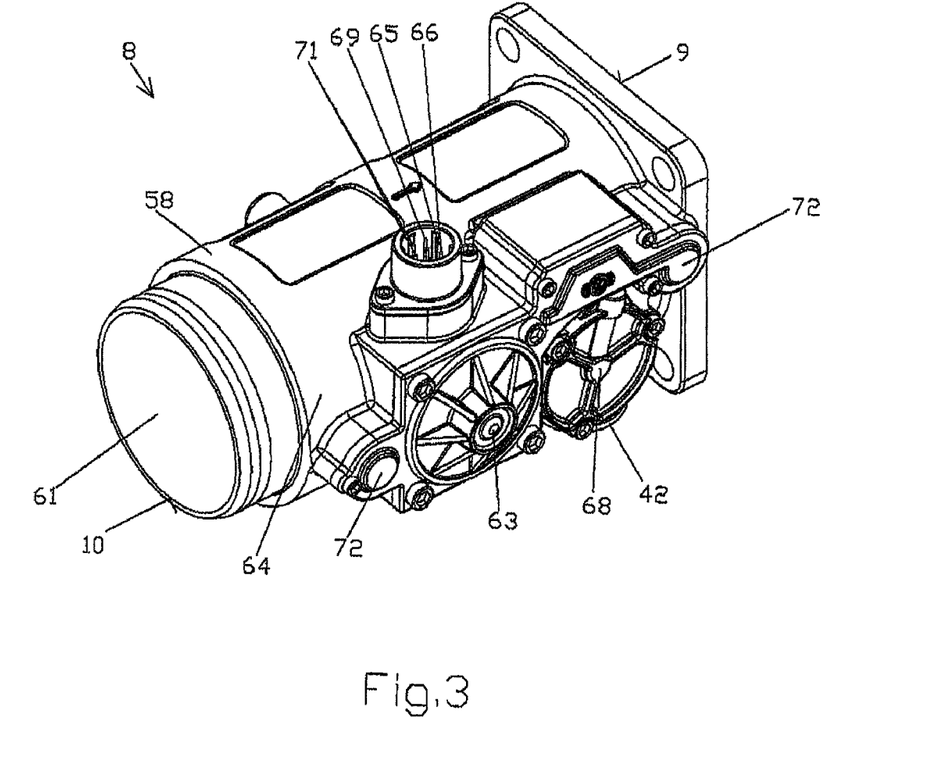
FIG. 3 is an axonometric image of the fresh gas line section seen from the end of the inflow.
Figure 4:
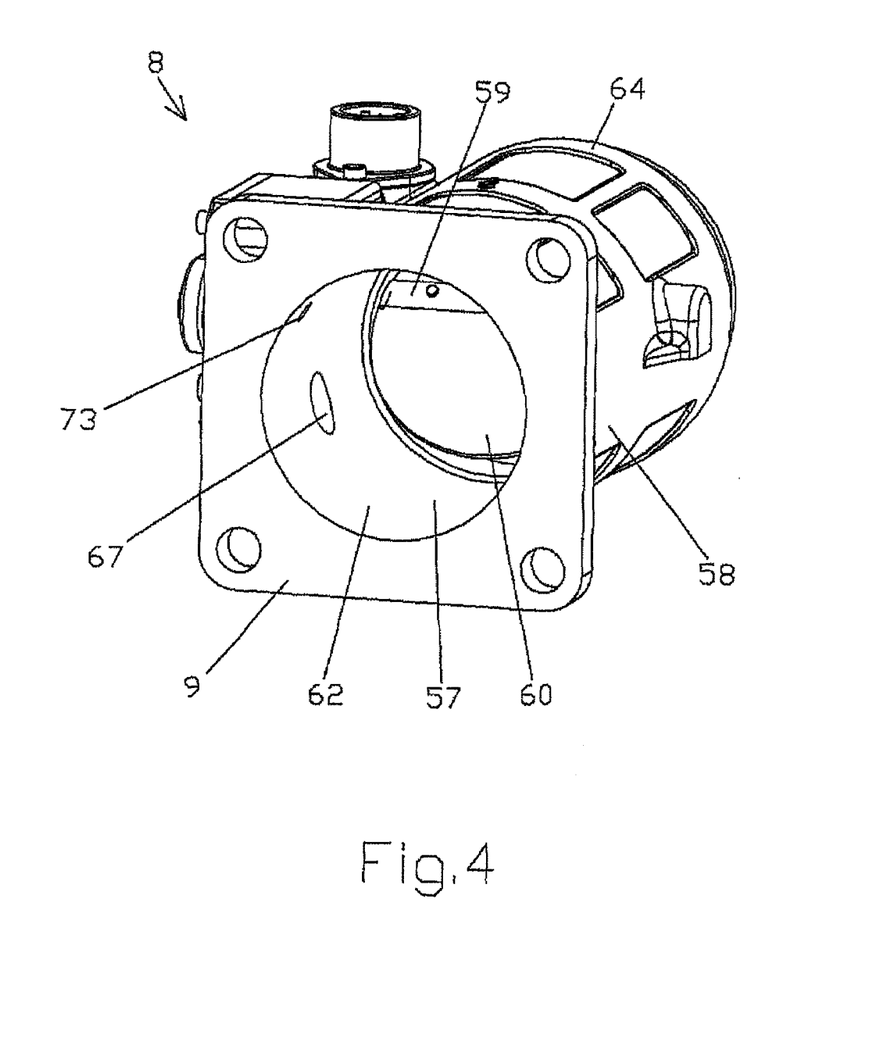
FIG. 4 is an axonometric image of the fresh gas line section seen from the end of the outflow.
Figure 5:
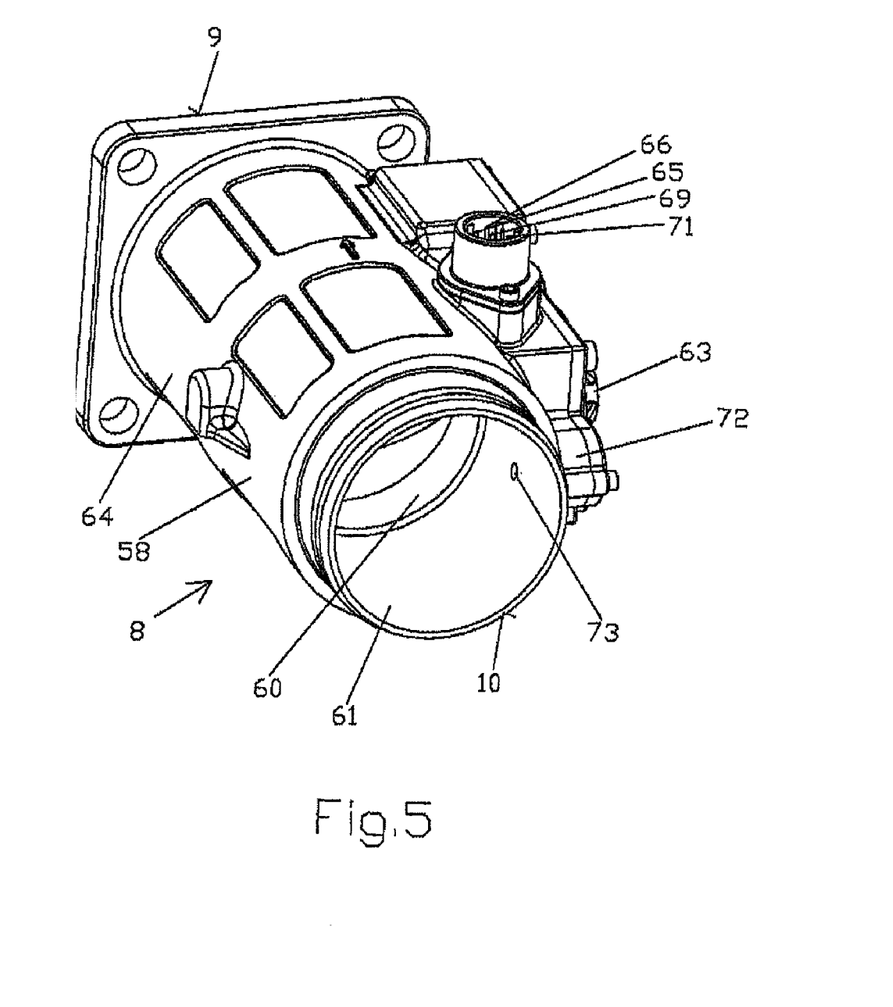
FIG. 5 shows an axonometric image of the fresh gas line section seen from above.

FIG. 2 shows and example of the fresh gas line section 8 in detail, the fresh gas line section 8 being embodied in a tubular fashion and having the first end port 10 and the second end port 9 between which there is an interior chamber 57 which can have, for example a circular cross section. The interior chamber 57 may be enclosed before the wall 58 in which the shaft 59 of a flap 60 is mounted and lead through. The flap 60 divides the interior chamber 57 into two parts, specifically the inflow space 61 which is formed between the first end port 10 and the flap 60, and the outlet space 62 which is produced between the second end port 9 and the flap 60. The flap 60 may be designed to assume one closed position and one fully opened position, and any desired number of positions therebetween which are set by rotating the shaft 59.

The adjustment device 66 may include in this exemplary embodiment an electric motor, and may be equipped with an electric adjustment device input 74 and an output 65 which are correspondingly operatively connected to the terminals of the collecting line 40 of the electronic control unit 38. The adjusting device 66 may be supplied with current by the adjustment device input 74. The signal may be obtained from the output 65, for example from a position of the flap 60. A exemplary compressed air inflow opening 67 may be formed between the second end port 9 and the flap 60 in the wall 58, and the compressed air port 42, which may be equipped with a quantity regulating device 68, is connected thereto. The quantity regulating device 68 also can assume a fully blocked position. The electric control input 69 of the exemplary quantity regulating device 68 which may include a valve 70 is connected to the collecting line 40 of the electronic control unit 38.

Similarly, in this embodiment the output 71 of the pressure sensor or pickup 72 which is attached to the wall 58, the pressure meter 73 of the pressure pickup 72 which extends into the outflow space 62 of the fresh gas line section 8, and a similar output 71 of the pressure pickup 72 which is attached to the wall 58 as well as the pressure meter 73 of the pressure pickup 72 which extends into the inflow space 61 may be connected to the collecting line 40 of the electronic control unit 38.

Figure 6:
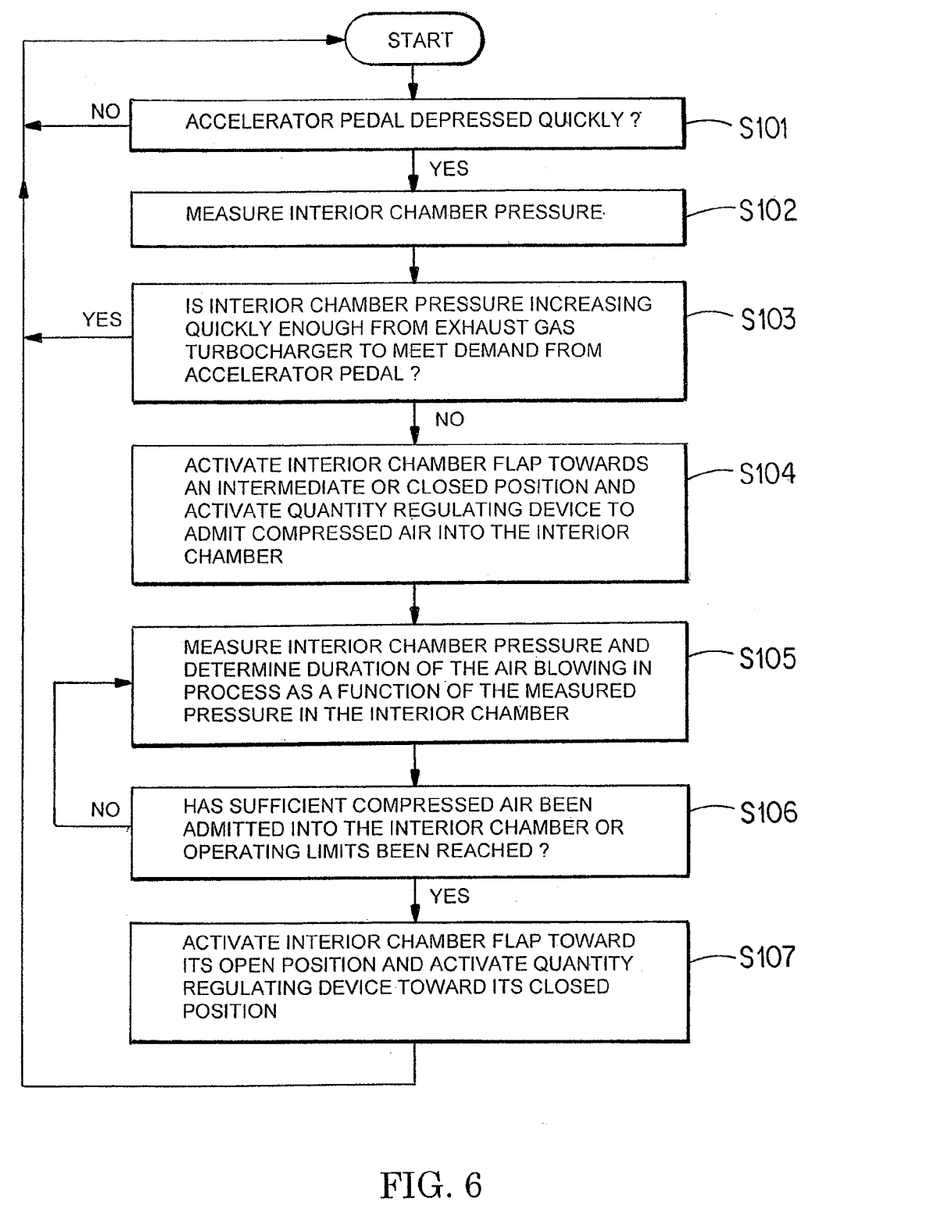
FIG. 6 shows an flow chart illustrating a method in accordance with an embodiment of the present invention.

The operation of the exemplary arrangement 1 is as follows: corresponding operation steps are shown in FIG. 6. Initially, the cylinders of the turbocharged diesel engine are fed with fresh gas through the intake lines 4, collecting line 5, fresh gas line section 8, line 11, charge air cooler 13, line 15, turbocompressor 17 and air filter 19, in operations where the engine's rotational speed is constant. The exhaust gases leave the cylinders 3 through the exhaust lines 27, exhaust collecting pipe 26, exhaust gas turbine 23 and exhaust pipe 29.

When the driver depresses the accelerator pedal 35 quickly so that the torque or engine speed is to be increased quickly (step S101), the turbocharged diesel engine 2 requires more fuel and more fresh gas, such as, for example, fresh air. The additional fuel is fed into the cylinder 3 but the increase in the fresh gas quantity which is supplied by the exhaust gas turbocharger 22 initially is insufficient. The pressure of the fresh gas may also be low, and it is continuously measured in the interior chamber 57 by using the pressure meter 73 (step S102). The signal generated by the measurement is fed to the electronic control unit 38 by the pressure pickup 72. In this operating state, according to an exemplary embodiment of the invention, the flap 60 is completely opened. The electronic control unit 38 may determine that the pressure is not increasing quickly enough in the interior chamber 57, and may determine, according to the exemplary control program, that additional air is to be blown in (step S103).

The control program may incorporate predetermined specifications about the conditions when the air blowing in process is to begin. For example, at the start, the flap 60 may be turned in the closing direction, and the blowing in of compressed air from the compressed air vessel 45, or other source, into the outflow space 62 may be enabled (step S104). The duration of the air blowing in process may also be predefined by the control program which takes into account, for example, the pressure difference and the absolute pressure, which have been measured by the pressure meters 73 (step S105, step S106, step 107).

Any operator such as a professional long distance driver or bus driver has his own driving style which may include, for example, average acceleration values, and may use specific shifting points of the transmission whose characteristic values can be determined, stored and used by the system. This is carried out, for example, by the computing system of the electronic control unit 38, and may be used by software for controlling the duration of the air blowing in process and activation of the flap at the electronic control unit 38. In one embodiment, the software is adapted to prevent the consumption of air from the vessel 45 from being so high that it adversely affects the braking safety, since the vessel 45 may be part of the vehicle's entire compressed air system, in which the most important part with respect to safety is the braking system. Nevertheless, the system may also be adapted to avoid an abrupt change in the acceleration assistance provided by the blowing in air, which is generally not acceptable.

According to embodiments of the invention, the duration of the air blowing in process and the activation of the flap may be regulated in an adaptive fashion by control software, which monitors and processes the frequency of the driver's requests for air blowing in to assist acceleration. As a result, the consumption of air is kept within certain limits but without incurring an abrupt change in the duration of the air blowing in process. This avoids the driver sensing an unexpected change, i.e. reduction, in the acceleration assistance. According to embodiments of the invention, the electronic control unit may monitor and/or store data regarding acceleration patterns of the driver, and may use it to predict an expected use of the additional compressed air for blowing in, subject to constraints such as maintaining an ample supply of compressed air for braking.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The following list of reference numbers is provided to increase the clarity of the specification and drawings.

1 Arrangement
2 Turbocharged diesel engine
3 Cylinder
4 Intake line
5 Collecting line
6 Cylinder block
7 Connecting flange
8 Fresh gas line section
9 Second "outflow" end port
10 First "inflow" end port
11 Line
12 Outflow opening
13 Charge air cooler
14 Inflow opening
15 Line
16 Outflow opening
17 Turbocompressor
18 Inflow opening
19 Air filter
20 Line
21 Shaft
22 Exhaust gas turbocharger
23 Exhaust gas turbine
24 Inflow opening
25 Outflow opening
26 Exhaust collecting pipe
27 Exhaust line
28 Outflow opening
29 Exhaust pipe
30 Injection nozzles
31 Line
32 Output
33 Random control unit
34 Output
35 Accelerator pedal
36 Line
37 Input
38 Electronic control unit
39 Terminal
40 Collecting line
41 Terminal
42 Compressed air port
43 Line
44 Outlet port
45 Compressed air vessel
46 Feed port
47 Line
48 Compressed air port
49 Compressed air compressor
50 Pressure regulator
51 Air dryer
52 Intake connector
53 Air filter
54 Shaft
55 Belt drive
56 Main shaft
57 Interior
58 Wall
59 Shaft
60 Flap
61 Inflow space 62 Outflow space
63 Position determining sensor
64 Outer face
65 Output
66 Adjusting device
67 Compressed air inflow opening
68 Quantity regulating device
69 Electric control input
70 Valve
71 Output
72 Pressure pickup
73 Pressure meter
74 Adjusting device input

What is claimed is:

1. A device for supplying fresh air to a turbocharged piston internal combustion engine, comprising:
   a fresh gas line section of an intake manifold having an adjustable flap and a first end port for flowing in, and a second end port for flowing out;
   an adjustment device coupled to the adjustable flap for continuously adjusting the adjustable flap;
   a compressed air port having an opening leading into a chamber of the fresh gas line between the adjustable flap and the second end port;
   a quantity regulating device of the compressed air port having a valve, the valve continuously movable to a blocked position and multiple open positions; and
   an electronic control unit for actuating the quantity regulating device using an electric input connected thereto, wherein the electronic control unit being programmed to receive a torque request and to initiate a compressed air addition event,
   wherein at least one of the electronic control unit and the quantity regulating device is configured to communicate with the adjustment device of the adjustable flap during the compressed air addition event, the at least one of the electronic control unit and the quantity regulating device being programmed to determine and to command the position of the adjustable flap and the amount of compressed air to be fed during the compressed air addition event, and either to command the adjustable flap to a fully closed position in coordination with the quantity regulating device being commanded to a fully open position, or to command the adjustable flap to an intermediate position between the open and closed positions in coordination with the quantity regulating device being commanded to an intermediate position between open and closed positions, and
   when the one of the quantity regulating device and the electronic control unit commands the adjusting device of the adjustable flap to the intermediate position between the open and closed positions, the intermediate position is determined as a function of at least one of the torque request and a fresh gas pressure in the fresh gas line section.

2. The device as claimed in claim 1, wherein an input terminal of the electronic control unit is operatively connected to an output of a first pressure pickup having a first pressure meter, the first pressure meter being arranged in the tubular interior between the adjustable flap and the first end port, and to an output of a second pressure pickup having a second pressure meter, the second pressure meter being arranged in the tubular interior between the adjustable flap and the second end port.

3. The device as claimed in claim 1, wherein, in the electronic control unit, a torque request signal originates from the at least one of an accelerator pedal, a traction controller, a cruise controller, an electric stability program, and elements for providing an external torque request to the engine control system.

4. The device as claimed in claim 1, wherein the adjustment device comprises a position determining sensor for direct activation by the electric control unit.

5. A method for improving acceleration behavior and emission behavior of a vehicle piston internal combustion engine with turbocharging, comprising the acts of:
   providing with a compressed air accumulator in which compressed air is stored, and in a regulated manner, for blowing-in compressed air into a fresh gas line section of an engine cylinder;
   determining a torque request signal and providing associated data to an electronic control unit;
   determining engine characteristic values and providing the characteristic values to the electronic control unit;
   determining a first air pressure value in an interior of an intake line between a cylinder inlet valve and a continuously adjustable flap of the fresh gas line section;
   determining a second air pressure value in an interior of an intake line between the adjustable flap and a turbo-compressor;
   providing the first and second pressure values to the electronic control unit; and
   processing the torque request signal, engine characteristic values and the pressure values in the electronic control unit to generate activation output signals for initiating a compressed air addition event by operating a continuously adjustable valve for blowing-in compressed air from the compressed air accumulator into the fresh gas line section to begin a blowing-in process, and for simultaneously activating the continuously adjustable flap in the closing direction when starting the blowing-in process, wherein the activation of the continuously adjustable valve and the continuously adjustable flap are coordinated by the electronic control unit as a function of at least one of the torque request signal and the first and second pressure values such that movement of the continuously adjustable flap to an intermediate position between the open and closed positions is conducted in coordination with actuation of the continuously adjustable valve between open and closed positions of the continuously adjustable valve.

6. The method as claimed in claim 5, further comprising generating activation output signals for operating the continuously adjustable flap in the opening direction when terminating the blowing-in process.

7. The method as claimed in claim 5, further comprising:
   monitoring actuation of a driver's accelerator pedal for a driver's request for acceleration;
   determining an average frequency of the driver's request for acceleration by software in the control unit;
   regulating of the blowing-in of compressed air and activation of the continuously adjustable flap in accordance with the determined average frequency of the driver's request for acceleration such that air consumption is maintained within defined limits during supply of compressed air in the air blowing-in process in response to a current driver's request for acceleration so as to prevent an abrupt change in duration of the air blowing-in process.

8. The method as claimed in claim 5, wherein the engine is a diesel engine.

9. A turbocharged internal combustion engine comprising:
an intake manifold having a fresh gas line section conveying a fresh gas from a turbocharger to an outlet of the fresh gas line section;
a continuously adjustable flap disposed in the fresh gas line section for controlling a flow of the fresh gas from the turbocharger;
a continuously adjustable quantity regulating device for controlling a flow of compressed air into the fresh gas line section via a port opening disposed between the adjustable flap and the outlet; and
an electronic control unit for controlling actuation of the adjustable flap and of the quantity regulating device, the electronic control unit being programmed to receive in response to a torque request signal, pressure values in the fresh gas line section and engine characteristic values and to initiate a compressed air addition event,
wherein the adjustable flap is activated by one of the quantity regulating device and the electric control unit as a function of at least one of the torque request signal, pressure values in the fresh gas line section and engine characteristic values such that movement of the adjustable flap to an intermediate position between the open and closed positions is coordinated with actuation of the quantity regulating device between open and closed positions of the quantity regulating device.

10. The turbocharger engine according to claim 9, further comprising an adjustment device coupled to the adjustable flap for positioning the adjustable flap between an open and a closed position.

11. The turbocharger engine according to claim 9, further comprising a valve of the quantity regulating device moveable between open and closed positions.

12. The turbocharger engine according to claim 9, wherein the electronic control unit commands the adjustable flap to an open position when the quantity regulating device is in a fully blocked position.

13. The turbocharger engine according to claim 10, wherein the electronic control unit commands operation of the quantity regulating device, and the adjustment device operates in response thereto.

14. The turbocharger engine according to claim 9, wherein the electronic control unit regulates supply of compressed air to the fresh gas line based on a determined average frequency of compressed air requests initiated by a driver's acceleration pedal.

15. The turbocharger engine according to claim 9, wherein the electronic control unit regulates supply of compressed air to the fresh gas line based on available compressed air for braking.

* * * * *